United States Patent [19]

Sparrevohn

[11] 4,444,999
[45] Apr. 24, 1984

[54] AUTOMATIC ELECTRONIC DISCONNECTOR FOR SUBSCRIBER TERMINAL EQUIPMENT

[76] Inventor: Frederic R. Sparrevohn, 143 Nieto, Apt. No. 1, Long Beach, Calif. 90803

[21] Appl. No.: 410,544

[22] Filed: Aug. 23, 1982

[51] Int. Cl.³ .................. H04M 1/64; H04M 11/00
[52] U.S. Cl. ................... 179/2 C; 179/2 A; 179/2 DP; 179/6.13
[58] Field of Search ............... 179/2 C, 2 A, 2 AM, 179/2 DP, 5 R, 5 P, 6.13, 6.15, 6.16, 6.14

[56] References Cited

U.S. PATENT DOCUMENTS

| | | | |
|---|---|---|---|
| 3,825,699 | 7/1974 | Danner | 179/6.16 |
| 3,859,463 | 1/1975 | Curtis | 179/6.16 X |
| 3,899,639 | 8/1975 | Cleveley et al. | 179/2 AM |
| 3,935,390 | 1/1976 | Winterhalter | 179/6.16 X |
| 4,311,875 | 1/1982 | Danner | 179/2 A |

Primary Examiner—Harold I. Pitts
Assistant Examiner—W. J. Brady
Attorney, Agent, or Firm—Charles A. Goodall

[57] ABSTRACT

An electronic circuit means for automatically disconnecting an off-hook subscriber's first telephonic signal sending and receiving terminal device which is in an off-hook mode when a second terminal device is taken off-hook. The disconnector circuit means has voltage sensing means, current sensing means and line disconnecting means. The voltage sensing means senses a voltage across the current sensing means and when at a pre-determined level turns the current sensing means on allowing current to flow through the first terminal device. When the second terminal device is taken off-hook, the voltage across the loop circuit drops and current flow through the current sensing means drops. When the current drops to a pre-determined value, the current sensing means actuates the line disconnecting means and shuts off the current flow through the first terminal device.

6 Claims, 7 Drawing Figures

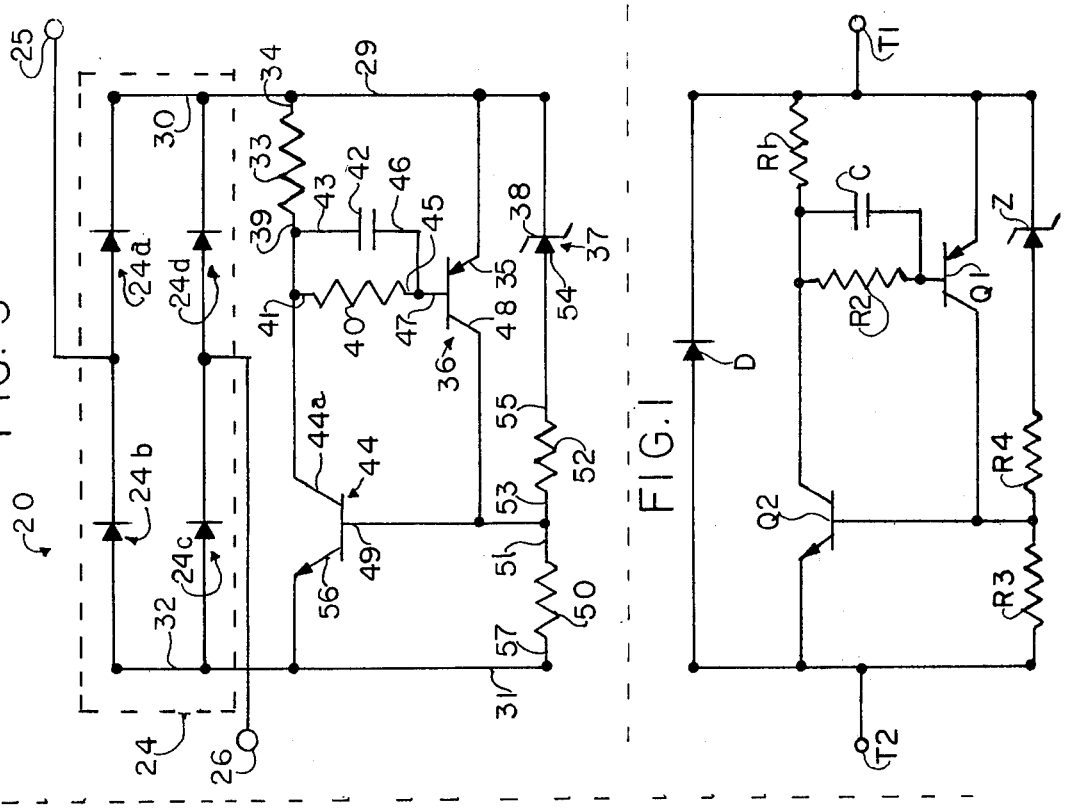
FIG. 5
FIG. 1
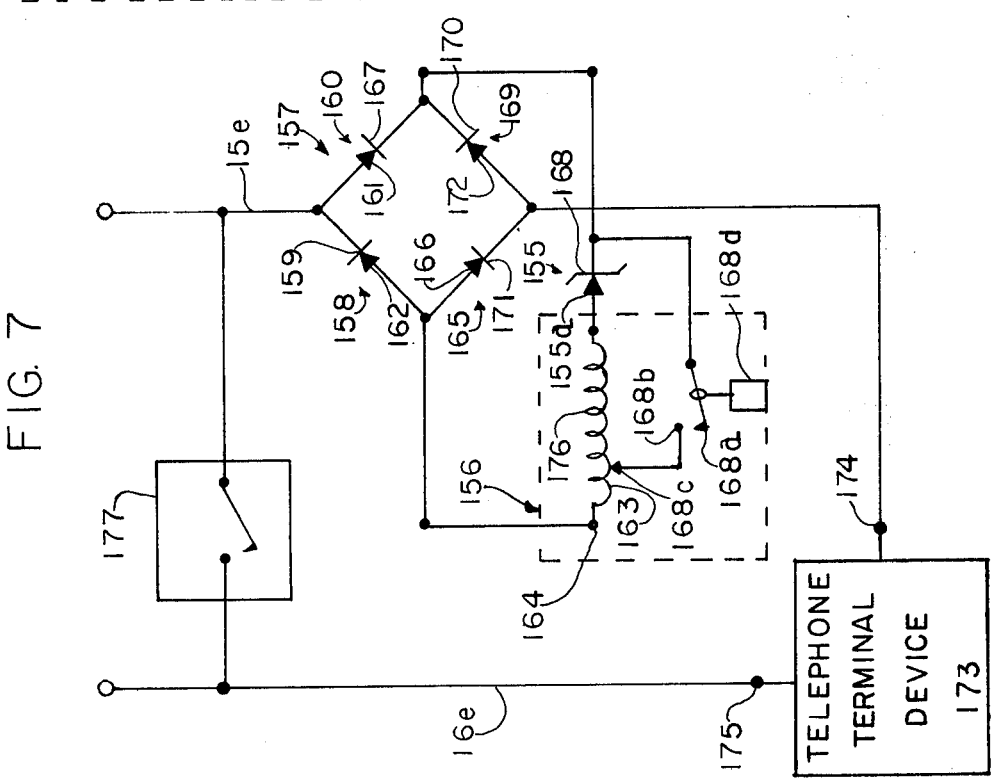
FIG. 7

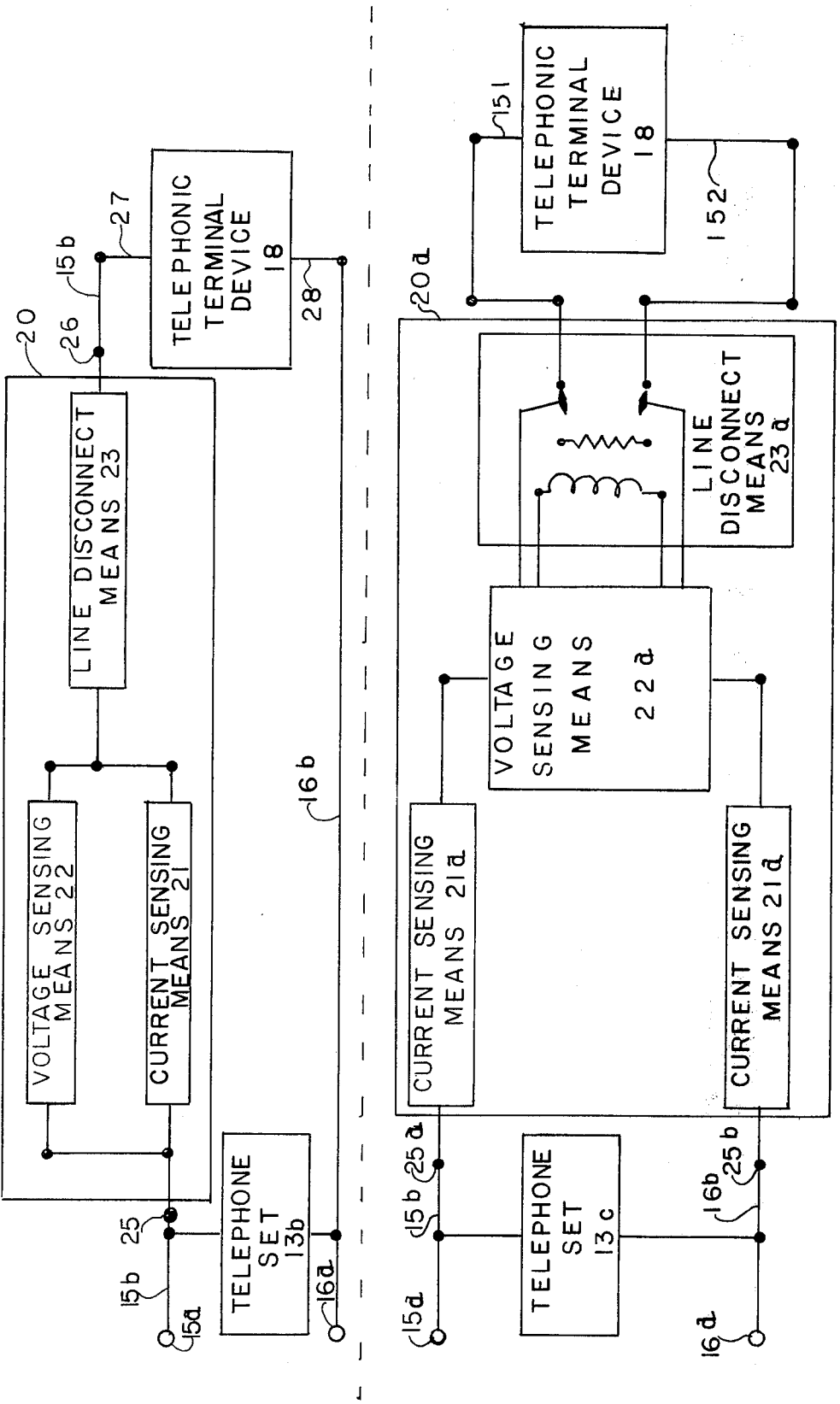

AUTOMATIC ELECTRONIC DISCONNECTOR FOR SUBSCRIBER TERMINAL EQUIPMENT

BACKGROUND OF THE INVENTION

1. Field of Invention

This invention relates to an electronic circuit means for automatically electronically disconnecting a subscriber's telephone line signal receiving and transmitting terminal equipment from a subscriber's end of a telephone loop circuit when a second telephone set or other terminal equipment is taken off-hook when the line signal receiving and transmitting terminal equipment is operating in an off-hook mode.

2. Prior Art

In telephone systems, a two wire loop is provided between a central office and subscriber's telephonic signal receiving and transmitting terminal equipment. A direct current (DC) voltage within the approximate range of from 42.5 volts to 52.5 volts is applied to the loop circuit as a signal carrier voltage at a central office and this is referred to as a central office battery. The central office has a means for superimposing an additional alternating current (AC) bell ringing voltage on the signal carrier voltage for notifying the subscriber of an incoming call. The bell ringing voltage is nominally between seventy-five and one hundred twenty volts and is primarily for actuating telephone bells on the subscriber's terminal equipment. This bell ringing voltage has been employed in telephone answering equipment for actuating the answering equipment and placing it in an off-hook mode. When the answering equipment goes off-hook, a switch in the answering equipment is closed permitting the signal carrier current to flow around the loop, thereby allowing the answering equipment to perform its function to transmitt and receive telephone signals. This terminal equipment to which the present invention is applicable includes telephone sets, telephone answering machines, computer terminal telephonic equipment, and similarly functioning equipment designed to be actuated by an incoming telephone signal and respond thereto over the telephone loop circuit.

When a telephone answering machine is hooked into the telephone loop circuit and is turned on to be operable, each time an incoming bell signal voltage actuates it, the machine goes off-hook and sends and receives messages in a pre-programmed manner. If a subscriber wishes to intercept any message using a telephone set on the same subscriber's loop circuit, the subscriber must first turn the answering machine off or it will continue to send its pre-recorded message and continue to function in the pre-programmed manner interfering with the subscriber's use of the telephone set. This invention provides a means for automatically disconnecting the answering machine or other terminal equipment in an off-hook mode from the subscriber's loop circuit when the subscriber takes another telephone or other terminal equipment off-hook providing the subscriber instant access to the telephone without interference from the answering machine. This opportunity has not previously been available without first shutting off the answering machine manually.

SUMMARY OF THE INVENTION

The present invention embodies an electronic disconnector circuit for automatically disconnecting or disabling an off-hook subscriber's answering device from the telephone loop circuit when the subscriber takes another answering device, such as a telephone set, off-hook. The disconnector circuit means is connected in series with the terminal device which is to be automatically disconnected thereby across the subscriber's loop circuit. The disconnector circuit means and its serially connected terminal device are in parallel with other terminal devices on the subscriber's loop circuit which are not to be automatically disconnected by the disconnector circuit means. The disconnector circuit means first allows the AC bell ringing voltage to appear across the serially connected terminal device placing the terminal device in an off-hook mode. In this mode DC current flows through the disconnector circuit means and the terminal device. The disconnector circuit means senses a voltage across itself, thereby actuating the circuit and allowing current to continue flowing therethrough. In this mode, the terminal device operates in its normal operational mode. When any of the other parallelly connected terminal devices, such as a telephone set, are taken off-hook, the voltage drop across the loop circuit is lowered. This causes the current flowing through the disconnector circuit means to drop. The disconnector circuit means then senses a change in current flowing through itself and shuts off the flow of current in the series circuit effectively shutting off the serially connected terminal device and placing it in an unactivated on-hook mode. This leaves the off-hook terminal device free from interference from the disconnected terminal device. Refering to the circuit diagram in FIG. 1, showing a specific embodiment of the present invention, the invention may more clearly be understood by describing this circuit as used with a telephone answering machine. The automatic electronic disconnector circuit shown in FIG. 1 comprises a circuit described as follows: A positive input terminal T1 connects in parallel configuration a cathode of a diode D, a first end of a first resistor R1, an emitter of a PNP transistor Q1, and a cathode of a zener diode Z. A second end of R1 connects to a first end of a second resistor R2, a first end of a capacitor C, and a collector of an NPN transistor Q2. Second ends of R2 and C connect to a base of Q1. A collector of Q1 connects to a base of Q2, to a first end of a third resistor R3 and to a second end of a fourth resistor R4. An anode of Z connects to a first end of R4. An anode of D, an emitter of Q2 and a second end of R3 are all connected to a negative output terminal T2.

The disconnector circuit is connected in series with the answering machine which is to be automatically placed in an on-hook mode when a telephone set is taken off hook. T1 is connected to a positive line of the loop circuit and T2 is connected to a positive terminal of the answering machine. The negative terminal of the answering machine is connected to the negative loop line. Diode D is included to assure that T1 is always positive with respect to terminal T2 to protect the transistors Q1 and Q2. A full wave diode rectifier bridge can be connected between the negative and positive terminals of the disconnector circuit and in series with the one of the loop circuit lines to assure that T1 will always be positive when loop current flows. This modified embodiment eliminates the need for the diode D and will be described more fully in the Preferred Embodiment section.

Basically, this embodiment of the automatic electronic disconnector circuit determines when to operate by sensing a combination of the voltage across itself and the amount of change in loop current flowing through the disconnector circuit and the answering machine.

An AC bell voltage from the central office is used to actuate the answering machine. This voltage is rectified by the diode so that a pulsating DC voltage appears at T1. This voltage is high enough to cause the zener diode Z to conduct, thereby causing the answering machine to switch to an off-hook mode allowing DC current to flow around the telephone loop circuit. When a parallelly connected telephone set is taken off-hook, the current flowing through the answering machine and the resistor R1 of the disconnector circuit drops. The change in voltage drop across R1 is transfered across capacitor C and resistor R2 to the base of Q1 reducing base drive current to Q2. This reduces the current flow through Q2 and further reduces the voltage drop across R1. This sequence continues until the circuit is completely turned off and the answering machine is returned to an on-hook mode. When the telephone set is returned to the on-hook mode, the answering machine will be returned to the off-hook mode if the pre-programmed sequence has not run its course. The machine will complete its pre-programmed functions and then will be ready for its next cycle of operation.

BRIEF DESCRIPTION OF THE DRAWINGS

FIG. 1 is a schematic circuit diagram of the present invention employing transistor means for sensing current combined with voltage sensing as a disconnector circuit with a diode means for protecting the transistor means from excessive voltage.

FIG. 3 is a block diagram showing a terminal device in series with a disconnector circuit means in a loop line of the two wire telephone loop circuit.

FIG. 4 is a block diagram of a second embodiment of the present invention for opening both of the loop circuit lines feeding the terminal device.

FIG. 5 is a modification of FIG. 1 employing a full wave diode rectifier means to assure that input voltage to the PNP transistor is positive.

FIG. 7 is a circuit diagram of an embodiment of the present invention employing a voltage sensitive zener diode and an electromagnetic relay means for disconnecting the terminal equipment.

DESCRIPTION OF PREFERRED EMBODIMENTS

Figure 2:
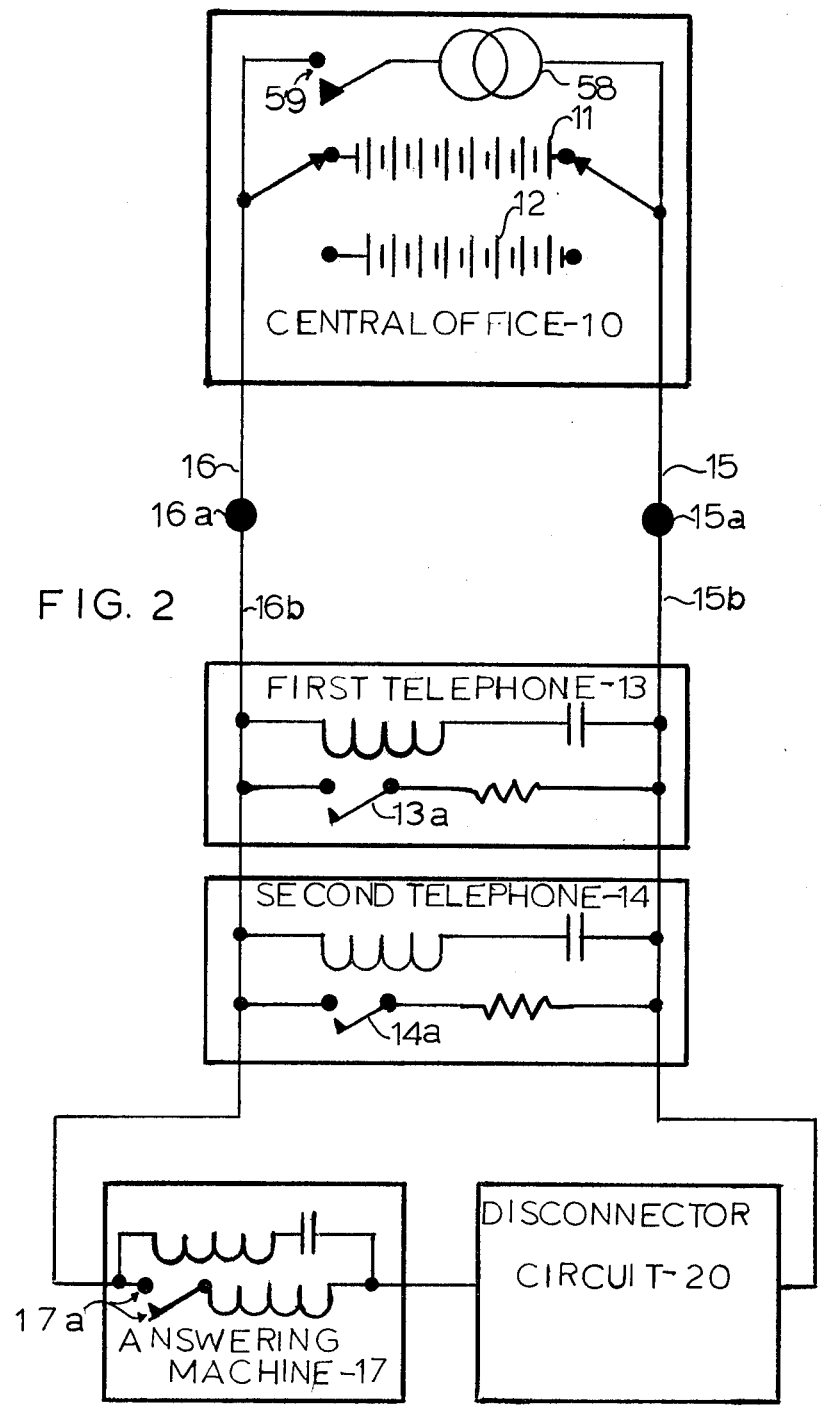
FIG. 2 is a block diagram of a telephone system embodying the present invention.

Referring to the block diagram of FIG. 2, a telephone system using the present invention is shown. Included is a central office 10 having positive and negative batteries 11 and 12 respectively. The batteries may be various types of sources of DC potential but are referred to herein for simplicity as batteries. Two subscriber telephone sets 13 and 14 each having an on-hook-off-hook switch 13a and 14a respectively are each connected between subscriber loop lines 15b and 16b. The subscriber loop lines are coupled to central office loop lines 15 and 16 respectively at subscriber line connecting terminals 15a and 16a respectively. A controlled telephone answering machine 17 is connected serially with an automatic electronic circuit disconnector means 20 forming a series network coupled between loop lines 15b and 16b. The disconnector circuit means 20 comprises the invention described herein. When the central office applies an AC bell ringing potential across lines 15 and 16, the answering machine 17 goes off-hook and a signal carrier DC potential receiving switch 17a closes. When a subscriber telephone set, represented here as one of two sets 13 and 14, is taken off-hook, the first set to be taken off-hook closing the on-hook-off-hook switch causes a voltage across the subscriber loop lines to drop thereby actuating the disconnector circuit as described in the summary section and herein below. Upon being actuated, the disconnector circuit stops the flow of current to the answering machine and the telephone set may thereafter be used without interference from the answering machine.

Two basic embodiments of the disconnector circuit of the present invention are shown in FIGS. 3 and 4. FIG. 3 shows a circuit for controlling current flow through a first loop line 15b into a telephonic terminal device 18 and out thereof through a second loop line 16b. FIG. 4 shows a circuit for opening both of the loop lines 15b and 16b connected to the terminal device 18. Each of these embodiments comprise current sensing means 21, voltage sensing means 22, and line disconnecting means 23.

Referring to the block diagram of FIG. 3 and the schematic diagram of FIG. 5 a preferred embodiment of the circuit is described. The circuit of FIG. 5 is a modification of the circuit of FIG. 1 described in the Summary section wherein the diode D is replaced by a full wave diode bridge rectifier 24 comprising diodes 24a, 24b, 24c, and 24a. A first circuit terminal 25 is connected to the first loop line 15b, and a second circuit terminal 26 is connected serially to a telephonic terminal device input 27. A telephonic terminal device output 28 is connected to the second loop line 16b as shown in FIG. 3. The order of the connections for the circuit described in FIG. 5 and the terminal device 18 is not important so long as the disconnector circuit 20 and the terminal device 18 are connected in series between the loop lines 15b and 16b.

A disconnecter circuit positive line 29 of the circuit 20 shown in FIG. 5 is connected to a bridge positive line 30 and a connector circuit negative line 31 is connected to a bridge negative line 32. The circuit positive line 29 further connects in parallel configuration a first resistor 33 first end 34, an emitter 35 of a PNP transistor 36 and a zener diode 37 cathode end 38. A first resistor second end 39 connects to a second resistor 40 first end 41, a capacitor 42 first end 43 and an NPN transistor 44 collector 44a. A second resistor 40 second end 45 and a capacitor 42 first end 46 both connect to a base 47 of the PNP transistor 36. A PNP transistor collector 48 connects to an NPN transistor 44 base 49, to a third resistor 50 first end 51 and a fourth resistor 52 second end 53. An anode 54 of the zener diode 37 connects to a fourth resistor 52 first end 55. An emitter 56 of the NPN transistor 44 and a third resistor second end 57 connect to the negative line 31.

As shown in the block diagram of FIG. 3, this embodiment of the automatic electronic disconnector circuit operates similarly to the embodiment shown in FIG. 1 which was described in the Summary section. The circuits differ only in that the bridge circuit 24 replaces the diode D. The bridge makes it possible to connect terminal 25 to a positive or negative loop line without making the disconnector circuit inoperative, so long as terminal 26 is connected to a loop line having opposite polarity to that to which terminal 25 is connected. The bridge assures that line 29 will always be positive with respect to line 31.

This embodiment determines when to operate by sensing a combination of voltage between lines 29 and 31 and an amount of change in loop current flowing through the series circuit of the disconnector circuit and terminal device. Referring to FIG. 2, an AC bell voltage means 58 applies an AC bell voltage between loop lines 15 and 16 upon the closing of the bell ring actuating means 59, here shown as a switch. This voltage is above the zener voltage and the zener diode 37 conducts current thereby causing the answering machine switch 17a to close placing the machine in an off-hook mode allowing DC loop current to flow through the telephone loop circuit lines 15 and 16 from the DC voltage source 11 in the central office. This DC voltage is used as a sound communication carrier in the telephone system.

When a parallelly connected subscriber's telephone set is taken off-hook, as for example the first telephone 13 of FIG. 2 and represented by telephone set 13b of FIG. 3, the telephone set switch 13a closes and places the telephone set in an off-hook mode and the DC voltage across lines 15 and 16 drops causing the current flowing through the first resistor 33 to drop producing a change in voltage drop across the first resistor. This change in voltage drop across the first resistor is transferred to the base 47 of the PNP transistor 36 across capacitor 42 and the second resistor 40 thereby reducing base and collector currents flowing in the PNP transistor. This reduces the base drive current of the NPN transistor 44 which further reduces the voltage drop across the first resistor and the sequence continues in an instantaneous manner and ultimately shuts off current flowing through the disconnecter circuit and its serially connected terminal device 18. The telephone set is then free from interference from the disconnected terminal device. When the telephone set is placed back on-hook, the switch 13a opens and if the terminal device is still in an operating mode, having not completed its pre-programmed sequence of operating events, the terminal device will be re-connected to the line and continue through the sequence until it is ready for the next bell ringing voltage to actuate it.

Figure 6:
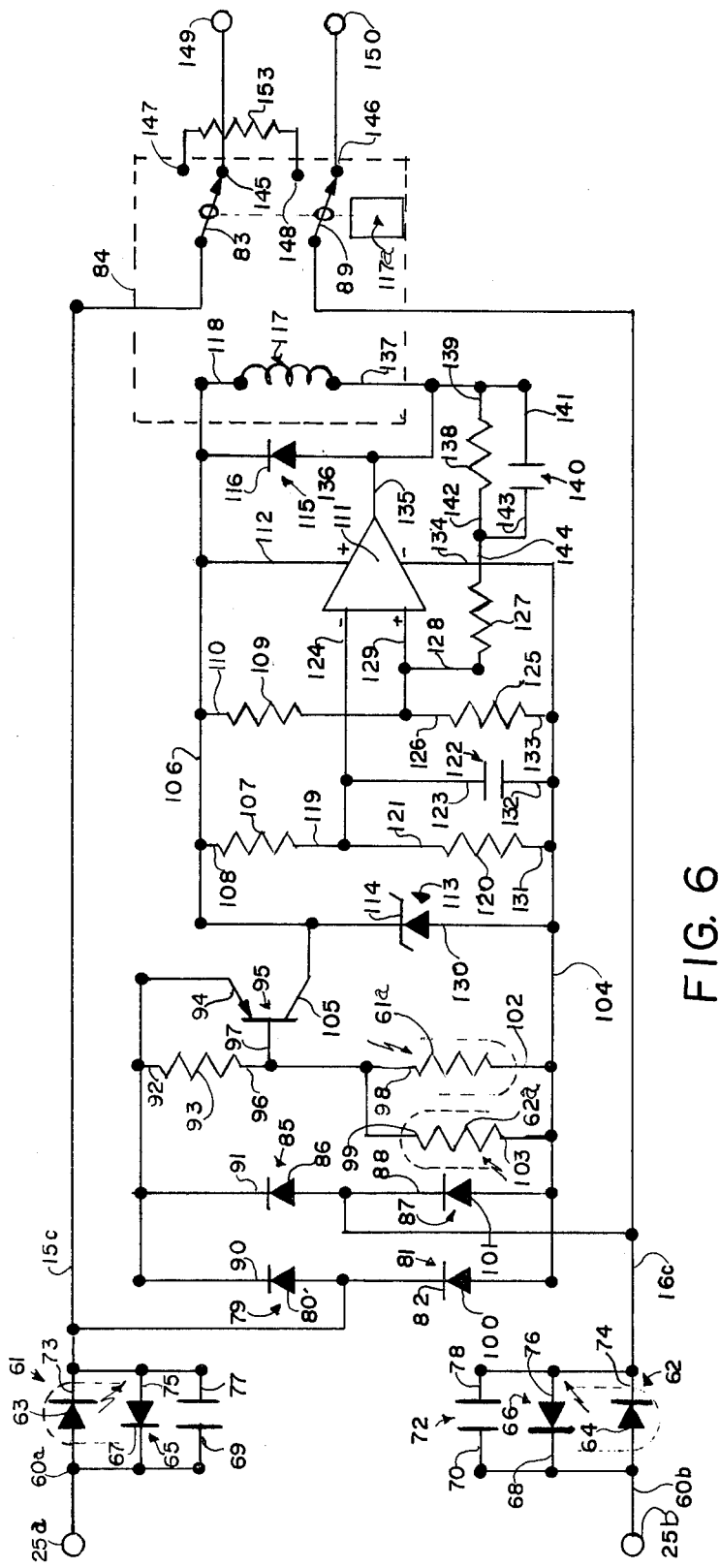
FIG. 6 is a circuit diagram of the disconnector circuit of FIG. 4 for opening both of the loop lines simultaneously.

In some instances it may be desirable to electronically and mechanically isolate the telephonic terminal device while a telephone set or other terminal device is taken off-hook. A second novel embodiment of this invention shown in block diagram FIG. 4 and schematic diagram FIG. 6 provides a means for achieving this mode of isolation. Referring to the block diagram of FIG. 4, when the terminal device 18 is actuated by the bell ringing voltage and goes off-hook, current flows through a current sensing means 21a actuating a voltage sensing means 22a. The voltage sensing means thereafter samples the voltage between loop lines 15b and 16b. When a telephone set 13c is taken off hook, the voltage between the loop lines 15b and 16b drops. The voltage sensing means 22a senses this voltage drop reduction and activates the line disconnecting means 23a thereby disconnecting the loop lines from the terminal device 18. When the telephone set is placed back on-hook, the voltage sensing means detects an increase in loop line voltage and de-activates the line disconnecting means thereby re-connecting the terminal device to the loop lines 15b and 16b.

Refering to FIG. 6, a second embodiment of the invention is described. Circuit terminals 25a and 25b are connected to loop lines 15b and 16b respectively and the terminals 25a and 25b are each respectively further connected to circuit lines 15c and 16c respectively at connecting positions 60a and 60b respectively which connect to first and second light emitting diodes (LED) 61 and 62 of first and second optical couplers at LED anode ends 63,64, to first and second diodes 65, 66 at cathode ends 67,68 thereof and to first ends 69,70 of first and second capacitors 71,72 respectively. LED cathode ends 73,74, first and second diode anodes 75,76, and first and second capacitor second ends 77, 78 are all respectively connected to loop lines 15b, 16b extensions 15c, 16c. The loop line extension 15c further connects to a third diode 79 anode end 80 and a fourth diode 81 cathode end 82 and further to a normally closed relay means 84 (shown enclosed in dotted lines). The loop line extension 16c further connects to a fifth diode 85 anode end 86 and a sixth diode 87 cathode end 88 and further to a second normally closed relay switching contact 89 of the relay means 84.

The third and fifth diode cathode ends 90,91 connect to a first end 92 of a first resistor 93 and an emitter 94 of a PNP transistor 95. A second end 96 of the first resistor connects to a base 97 of the PNP transistor and to light sensitive resistors 61a, 62a first ends 98, 99. The light sensitive resistor 61a and LED 61 and light sensitive resistor 62a and LED 62 are optical couplers 61 and 62 respectively. Anodes 100, 101 of the fourth and sixth diodes and second ends 102, 103 of resistors 61a and 62a respectively are all connected to a negative line 104 of the disconnector circuit. A collector 105 of the PNP transistor connects to a positive line 106 of the disconnector circuit. The positive line 106 connects to a second resistor first end 108, a third resistor 109 first end 110, an operational amplifier 111 positive power lead 112, a zener diode 113 cathode end 114, a seventh diode 115 cathode end 116, and a relay coil 117 first end 118 of the relay 84. A second resistor 107 second end 119 connects to a fourth resistor 120 first end 121, a third capacitor 122 first end 123 and to a negative input 124 of the operational amplifier 111. The third resistor 109 connects to a fifth resistor 125 first end 126, a sixth resistor 127 first end 128, and a positive input 129 of the operational amplifier 111. A zener diode 113 anode end 130, a fourth resistor 120 second end 131, a capacitor 122 second end 132, a fifth resistor 125 second end 133, and an operational amplifier 111 negative power lead 134 are all connected to the negative line 104. An operational amplifier 111 output 135 is connected to a seventh diode anode end 136, a relay coil 117 second end 137, a seventh resistor 138 first end 139 and an eighth capacitor 140 first end 141. A seventh resistor 138 second end 142 and eighth capacitor 140 second end 143 are connected to a sixth resistor 127 second end 144. The relay first and second switching contacts 83, 89 co-operably switch respectively between first and second stationary relay contacts 145, 146, and third and fourth stationary contacts 147, 148 of the relay 84. The said first and second switching contacts are cooperably maintained in a normally closed position as shown in FIG. 6 by a spring means 117a. The first and second stationary contacts are connected respectively to positive and negative terminals 149, 150 of the disconnector circuit for connecting respectively to a terminal device positive lead 151 and a negative lead 152. Connected across the third and fourth stationary contacts 147, 148 is an eighth resistor 153.

When the disconnector circuit of FIG. 6 is connected as shown in the block diagram of FIG. 4, the following operational sequence of FIG. 6 applies.

The central office 10 ring signal means applies an AC bell ringing voltage to the loop circuit. AC current flows around the loop circuit following a path through the first and second capacitors, the first and second relay contacts and the terminal device thereby actuating the terminal device to an off-hook mode. While the terminal device is off-hook, DC current flows from the central office around the loop circuit and through the terminal device. If line 15 is positive with respect to line 16, current flows through the light emitting diode (LED) 61 and the second diode 66. If line 15 is negative with respect to line 16, current flows through LED 62 and the first diode 65. A diode full wave rectifier bridge comprising the third, fourth, fifth and sixth diodes 79, 81, 85, and 87 provides a positive voltage to the emitter 94 of the PNP transistor 95 whether line 15 is positive or negative with respect to line 16. When current flows through either of the LEDs 61 or 62, the LED will emit light and cause its corresponding light sensitive resistor 61a or 62a to conduct current providing base drive for the PNP transistor 95 thereby turning the PNP transistor on. This transistor is basically a switch used to switch power to the disconnector circuit when the terminal device 18 goes off-hook. Second, third, fourth and fifth resistors 107, 109, 120, and 125 form a balanced bridge. When power is first applied, the third capacitor 122 holds the voltage at the capacitor 122 first end 123, the negative input 124 of the operational amplifier 111, to a value which is lower than the voltage at the positive input 129 of the operational amplifier long enough so that the voltage at the output 135 of the operational amplifier rises to that of the collector 105 of the PNP transistor. A positive voltage from the operational amplifier output is then fed back to the positive input through feed back resistors seventh and sixth so that the output of the amplifier remains positive even after the charge on the third capacitor stabalizes. This maintains the relay coil 117 in-operative and the normally closed switching contacts 83, 89 are held closed by the spring means thereby maintaining the terminal device in the loop circuit.

When the telephone set 13c (FIG. 4) is taken off-hook, the voltage between loop lines 15b and 16b drops. This will lower the voltage at the positive input to the operational amplifier earlier than at the negative input causing the operational amplifier output to swing to the potential of the negative line 104. The feed back through the sixth and seventh resistors will keep the output of the operational amplifier at the potential of the negative line. Current will flow through the relay coil and co-operably switch the relay switching contacts to stationary contacts 147 and 148 thereby disconnecting the terminal device 18 from the loop circuit. The eight resistor 153 permits current to continue flowing through the optical couplers and the disconnector circuit remains energized. The eighth capacitor 140 provides a stored charge for a sufficient duration when the operational amplifier output goes negative to permit the switching contacts to switch without causing the operational amplifier to go positive during the interval the loop circuit is open during the contact switching time. The zener diode 113 provides protection against excessively high voltage being applied to the operational amplifier. The seventh diode 115 provides for disipation of voltage spikes produced when current stops flowing through the relay coil 117. Referring to FIG. 8, a fourth embodiment of the invention is shown employing a voltage sensitive zener diode 155 and an electromagnetic relay means 156 sensitive to small current changes. A full wave diode rectifier bridge 157 is serially connected in a loop line 15e for assuring that a cathode end of the zener diode is always positive with respect to an anode end 155a of the zener diode when current flows through the circuit. The first loop line 15e is connected to a first bridge diode 158 cathode end 159 and a second bridge diode 160 anode end 161. A first diode anode end 162 is connected to a relay coil 163 negative end 164 and a third bridge diode 165 anode end 166. A second bridge diode cathode end 167 is connected to a zener diode 155 cathode end 168, a fourth bridge diode 169 cathode end 170 and a zener diode by-pass relay switching contact 168a. The switching contact is maintained normally open with respect to a relay stationary contact 168b by a mechanical spring means 168d. The stationary contact is connected to a relay coil variable contact disposed between the relay coil negative end and a relay coil positive end 168c. A third diode cathode end 171 and a fourth diode anode end 172 are both connected to a terminal device 173 and a loop line input terminal 174 and a terminal device loop line output terminal 175 connects to a second loop line 16e.

When the central office sends the AC bell ringing signal over the loop line, the voltage is sufficiently high to exceed the zener diode zener voltage and current flows through the loop circuit and through the relay coil thereby causing the switching contact to close. This electrically by-passes the zener diode and DC current is permitted to flow through the variable contact and out through the lower portion of the relay coil and then through the off-hook terminal device 173 and through the loop line 16e back to the central office. The variable coil contact is adjusted so that a sufficiently strong electromagnetic field is developed to hold the switching contact in closed position until a telephone set 177 is taken off-hook. When the telephone set is taken off-hook, the loop line voltage across the subscriber's loop lines 15e, 16e drops lowering the voltage across the coil and the current flowing through it and the electromagnetic field is no longer strong enough to hold the switched contact closed. The contacts open and the terminal device is disconnected and no longer interferes with the telephone set.

Although these exemplary embodiments of the invention have been disclosed for the purpose of illustration, it will be understood that various changes, modifications and substitutions may be incorporated which do not constitute a departure from the spirit and scope of the invention as set forth in and defined by the claims appearing hereinafter.

I claim as my invention:

1. An electronic disconnector circuit means for automatically disconnecting a subscriber's first telephonic terminal device from a subscriber's telephonic two wire loop circuit when a second subscriber's terminal device is taken off-hook with the first terminal device in an off-hook mode, said disconnector circuit means comprising:

a. an input terminal for connecting to a first line of the subscriber's two wire loop circuit and an output terminal for connecting to an input terminal of said first terminal device, said first terminal device having a first terminal device output terminal connected to a second line of said two wire loop circuit, said disconnecting circuit means and said first terminal device thereby being serially connected between said first and second lines of the two wire loop circuit, b. a current sensing means connected serially with a line disconnecting means between said input and output terminals, and a voltage sensing means connected in parallel with said current sensing means, said voltage sensing means for detecting a voltage drop across the current sensing means and turning the current sensing means on at a predetermined voltage level thereby allowing current to flow through the current sensing means and the first terminal device from the loop circuit, said current sensing means for sensing and monitoring flow of current through the first terminal device and for activating the line disconnecting means to turn off current flow to the first terminal device when said current flow is reduced below a pre-determined level resulting when said second terminal device is taken off-hook, said second terminal device being connected across from said first line to said second line and in parallel with said serially connected disconnector circuit means and said first terminal device, and when said second terminal device is returned to an on-hook mode, said current sensing means senses current flow and said first terminal device is again connected in the loop circuit.

2. An electronic disconnector circuit means according to claim 1 wherein said current sensing means, said line disconnecting means and said voltage sensing means comprises in combination said input terminal of the disconnector means having parallelly connected thereto a cathode of a diode, a first end of a first resistor, an emitter of PNP transistor, and a cathode of a zener diode, said first resistor having a second end connected to a first end of a second resistor, a first end of a capacitor and a collector of a NPN transistor, said second resistor having a second end connected to a second end of said capacitor and a base of said PNP transistor, said PNP transistor having a collector connected to a base of said NPN transistor, a first end of a third resistor, and a second end of a fourth resistor, said zener diode having an anode connected to a first end of said fourth resistor, said diode having an anode connected to an emitter of said NPN transistor, a second end of said third resistor and to said output terminal of the disconnector circuit means, said input terminal for connecting to a positive line of the two wire loop circuit and said output terminal for connecting to the input terminal of the first terminal device, said combination senses a combination of voltage across itself and a change in loop current flowing through itself and the first terminal device; when an AC bell voltage from a central office is applied to the two wire loop circuit, the zener diode senses this voltage and allows current to flow therethrough thereby actuating the first terminal device into the off-hook mode allowing DC current to flow through the disconnector circuit means and the said first terminal device, the disconnector circuit means current sensing means, including the first, second and third resistors, the capacitor and the PNP and NPN transistors, allows loop current to flow therethrough thereby shorting out the zener diode; when the second terminal device is taken off-hook, a DC loop voltage drops, thereby decreasing current flow through the first resistor thereby in turn reducing base drive to the PNP transistor and decreasing current flow therethrough and through the NPN transistor and decreasing current flow therethrough and through the NPN transistor; when the current flow drops to a pre-determined value, determined by the circuit component values, current flow stops and the first terminal device is disconnected; when the second terminal device is returned to the on-hook mode, current again flows through the disconnector circuit means and the first terminal device until the first terminal device is de-activated in accordance with its pre-programed cycle, the diode is to protect the current sensing means from reverse current flow while AC current is flowing through the zener diode.

3. An electronic disconnector circuit means according to claim 2 wherein the diode is replaced with a full wave diode rectifier bridge circuit means and the input terminal of the disconnector circuit means is connected to a positive bridge output terminal and the disconnector circuit means output terminal is connected to a negative bridge output terminal, and a first bridge input terminal is connected to one of the lines of the two wire loop circuit and a second bridge input terminal is connected to an input of the first terminal device or in the alternative to an output of the first terminal device and wherein the first terminal device output or input which is not connected to the disconnector circuit means bridge circuit is connected to the loop line to which the first bridge input is not connected.

4. An electronic disconnector circuit means for automatically disconnecting a subscriber's first telephonic terminal device from a subscriber's telephonic two wire loop circuit when a second subscriber's terminal device is taken off-hook with the first terminal device in an off-hook mode, said disconnector circuit comprising an input terminal for connecting to either of the first or second lines of the said two wire loop circuit, having a full wave diode bridge rectifier means attached thereto at a bridge input terminal, said bridge having a bridge output terminal for connecting to an input terminal of a first telephonic terminal device, said bridge further having positive and negative terminals and having a cathode of a zener diode and a relay means movable switching contact terminal means connected to said positive bridge terminal, said zener diode having an anode connected to a first end of an electromagnetic relay coil, said coil having a second end connected to the bridge negative terminal and having intermediate the first and second coil ends a connection to a stationery relay switch contact, said movable switching contact operable by said relay coil when current flows therethrough to close said relay contacts, said switching contact having mechanical spring means for maintaining the contacts in an open position when said relay coil is not energized; when a central office AC bell ringing signal is applied to the loop circuit, the zener diode permits current to flow therethrough thereby energizing the relay and closing the contacts and at the same time actuating the serially connected first terminal device into an off-hook mode thereby allowing DC current to flow through the loop circuit and through the disconnector and the first terminal device, this shorts out the zener diode and allowing DC current to flow through the loop circuit, a relay coil contact holding section between said stationary contact connection to said coil and said second end of said coil producing a switched contact holding electromagnetic force thereby holding the switched contact in a closed position; when a second terminal device connected parallelly across the two wire loop circuit with respect to the serially connected disconnector circuit means and the first terminal device is taken off-hook, a loop voltage drops and current flowing through the relay coil drops below a current value sufficient to produce the required electromagnetic holding force and the switched contact opens thereby returning the first terminal device to an on-hook mode.

5. An electronic disconnector circuit means for automatically disconnecting and isolating from a subscriber's telephonic two wire loop circuit a subscriber's first telephonic terminal device when a subscriber's second telephonic terminal device is taken off-hook with said first terminal device being off-hook comprising:
   a. first and second disconnector input terminals for connection to first and second loop lines respectively of said loop circuit,
   b. first and second disconnector output terminals corresponding respectively with said first and second disconnector input terminals, said output terminals for connection respectively to input and output terminals of said first telephonic terminal device,
   c. a first current sensing means having first current sensing means input terminal connected to said first disconnector input terminal and a first current sensing means output terminal connected to a line disconnecting means first relay switching contact member,
   d. a second current sensing means having a second current sensing means input terminal connected to said second disconnector input terminal and a second current sensing means output terminal connected to a line disconnecting means second relay switching member,
   e. a voltage sensing means having a voltage sensing means input terminal connected to the output terminal of the first current sensing means and having a voltage sensing means output terminal connected to the output terminal of the second current sensing means,
   f. a line disconnecting relay means having said first and second relay switching contact members for switching between first and second sets of relay stationary contacts respectively, said switching contact members operable by spring means for making contact between the first switching contact member and a first set first stationary contact and between the second switching contact member and a second set first stationary contact, thereby maintaining said first and second switching contacts normally closed with first and second set first stationary contacts respectively, said first and second switching contacts further operable in opposition to said spring means by an electromagnetic relay coil when current flows therethrough for making contact between the first switching contact member and a first set second stationary contact and between the second switching contact member and a second set second stationary contact, said second stationary contacts having a current sustaining resistor member connected therebetween for permitting a limited amount of current flow therethrough;

when the first and second disconnector input terminals are connected respectively to first and second lines of the subscriber's two wire loop circuit and the first and second disconnector output terminals are connected respectively to the first telephonic terminal device input and output terminals, and when an AC bell ringing signal is applied at a central office, the first terminal device is activated and loop DC current flows, the current sensing means senses the current and turns on the voltage sensing means, thereafter when a second telephonic terminal device connected across the two wire loop circuit is taken off-hook, loop circuit voltage is thereby reduced, the voltage sensing means senses this reduction in loop circuit voltage and activates the line disconnecting relay means thereby opening the lines to the first terminal device; when the second terminal device is returned to an on-hook mode, the loop circuit voltage is increased and the relay member is de-energized returning the first terminal device to a line connected condition, the resistor member is for maintaining current flow through the current sensor means thereby maintaining the voltage sensor means in an on condition while the first terminal device is disconnected from the two wire loop circuit.

6. An electronic disconnector circuit means according to claim 5 wherein each of the current sensor means comprises an optical coupler comprising in combination a light emitting diode and a light sensitive resistor, said light emitting diode having an LED anode connected to the current sensor input and an LED cathode connected to the current sensor output, said light emitting diode further having parallelly connected across the light emitting diode an AC bell ringing signal by-pass capacitor and a DC current by-pass diode having a by-pass diode cathode and anode connected to the LED anode and cathode respectively, said current sensors in combination with said voltage sensor and said voltage sensor means comprising in combination;
   a full wave diode rectifier bridge circuit having a bridge input terminal connected to the voltage sensor input and a bridge output terminal connected to the voltage sensor output, said bridge circuit further having a positive DC terminal connected to a first resistor at a first resistor first end and to an emitter of a PNP transistor, said first resistor being further connected to a base of said PNP transistor at a first resistor second end and further to each of said optical coupler light sensitive resistors at light sensitive resistor first ends, said first resistor in combination with either of said light sensitive resistors for providing a turn-on base drive for the PNP transistor when current flows through either of the optical coupler light emitting diodes, said light sensitive resistors being connected to a bridge DC negative terminal at light sensitive resistor second ends, said PNP transistor having a collector connected to first ends of second and third resistors, a positive control lead of an operational amplifier circuit means, a cathode of a relay coil by-pass diode, a first end of said relay coil, and a cathode of an operational amplifier protective zener diode, said second resistor is connected at a second resistor second end to a negative input of the operational amplifier, a first end of a fourth resistor and a first end of a third capacitor, said fourth resistor, third capacitor and zener diode having second ends connected to said bridge negative terminal, said third resistor having a second end connected to said operational amplifier positive input and first ends of fifth and sixth resistors; a negative power lead of the operational amplifier and a second end of said fifth resistor are connected to said bridge negative terminal, said relay coil second end and a second end of the relay coil by-pass diode, a second end of a seventh resistor and a second end of a fourth capacitor are connected to an output lead of the operational amplifier, and first ends of the seventh resistor and the third capacitor are connected to a second end of the sixth resistor; the PNP transistor is for turning the voltage sensing circuit on when DC current flows through either of the light emitting diodes, the zener diode is for protecting the operational amplifier from excessive voltage, the second, third, fourth and fifth resistors form a balanced resistor bridge circuit and when the sensor is first turned on, the third capacitor holds the voltage at the operational amplifier negative input lower than the voltage at the operational amplifier positive input until the output of the operational amplifier goes positive to the collector potential of the PNP transistor, thereafter a positive voltage is fed back through sixth and seventh resistors to the operational amplifier positive input thereby maintaining the high positive potential on the operational amplifier output and no current flows through the relay coil thereby keeping the first telephonic terminal device off-hook once having been activited by the AC bell ringing signal which flows through the bell ringing signal by-pass capacitors to actuate the said first terminal device; when a subscriber's second terminal device connected across the subscriber's loop circuit is taken off-hook, the loop voltage is decreased thereby and the positive input to the operational amplifier is reduced and the output of the operational amplifier swings negative to or near the potential of the bridge negative terminal and current flows through the relay coil thereby actuating the relay switching contacts and opening the line to the first terminal device; when the second terminal device is placed back on-hook, the operational amplifier output returns to the PNP transistor collector potential and no current flows through the relay coil thereby allowing the switching contacts to return to the normally closed line position.

* * * * *